(12) United States Patent
Tsai et al.

(10) Patent No.: US 9,407,087 B2
(45) Date of Patent: Aug. 2, 2016

(54) OVER VOLTAGE PROTECTION CIRCUIT AND ELECTRONIC SYSTEM FOR HANDLING HOT PLUG

(71) Applicant: Anpec Electronics Corporation, Hsin-Chu (TW)

(72) Inventors: Ming-Jung Tsai, Hsinchu (TW); Kun-Min Chen, Changhua County (TW)

(73) Assignee: Anpec Electronics Corporation, Hsin-Chu (TW)

( * ) Notice: Subject to any disclaimer, the term of this patent is extended or adjusted under 35 U.S.C. 154(b) by 169 days.

(21) Appl. No.: 14/327,547

(22) Filed: Jul. 9, 2014

(65) Prior Publication Data

US 2014/0321016 A1    Oct. 30, 2014

Related U.S. Application Data

(63) Continuation-in-part of application No. 13/325,066, filed on Dec. 14, 2011, now abandoned.

(30) Foreign Application Priority Data

Aug. 8, 2011  (TW) .............................. 100128216 A (51) Int. Cl.
*H02H 9/04* (2006.01)
*H02H 9/00* (2006.01)

(52) U.S. Cl.
CPC ..................................... *H02H 9/004* (2013.01)

(58) Field of Classification Search
CPC ................................. H02H 9/004; H02H 9/04
USPC .......................................................... 361/91.5
See application file for complete search history.

(56) References Cited

U.S. PATENT DOCUMENTS

| | | | |
|---|---|---|---|
| 5,132,936 A | 7/1992 | Keswick | |
| 7,324,316 B2 | 1/2008 | Chen | |
| 2006/0012929 A1* | 1/2006 | Chen | H02H 9/004 361/91.1 |
| 2006/0279262 A1 | 12/2006 | Chiang | |
| 2007/0263332 A1 | 11/2007 | Apfel | |
| 2009/0195943 A1 | 8/2009 | Liu | |
| 2010/0045357 A1* | 2/2010 | Chen | H02H 9/004 327/309 |

FOREIGN PATENT DOCUMENTS

| | | |
|---|---|---|
| TW | M332321 | 5/2008 |
| TW | I301936 | 10/2008 |
| TW | 201123665 | 7/2011 |

* cited by examiner

*Primary Examiner* — Thienvu Tran
*Assistant Examiner* — Kevin J Comber
(74) *Attorney, Agent, or Firm* — Winston Hsu; Scott Margo (57) ABSTRACT

An over voltage protection circuit comprises an input end, coupled to an input power, for receiving an input voltage provided by the input power; and a driving module, coupled between the input end and a ground end, for generating a discharging current when the input voltage is larger than a predefined voltage, to reduce the input voltage to the predefined voltage. The driving module comprises a voltage regulating module, a p-channel metal-oxide-semiconductor field-effect transistor (PMOS), and an n-channel metal-oxide-semiconductor field-effect transistor (NMOS). The PMOS and the NMOS are an upper gate switch and a lower gate switch of a motor driver or a fan driver.

12 Claims, 8 Drawing Sheets

OVER VOLTAGE PROTECTION CIRCUIT AND ELECTRONIC SYSTEM FOR HANDLING HOT PLUG

CROSS REFERENCE TO RELATED APPLICATIONS

This is a continuation-in-part application of U.S. application Ser. No. 13/325,066, filed Dec. 14, 2011, which is included herein by reference.

BACKGROUND OF THE INVENTION

1. Field of the Invention

The present invention relates to an over voltage protection circuit and an electronic system, and more particularly, to an over voltage protection circuit and an electronic system capable of utilizing an upper gate switch and a lower gate switch of a motor driver or a fan driver (i.e. embedded driver-MOS IC in motor-driver application) to mitigate over voltage generated by a hot plug.

2. Description of the Prior Art

Most electronic devices (e.g. a fan, a display device) require a voltage provided by a power supply for operating regularly. When an electronic device is coupled to the power supply via a hot plug action, the power supply outputs a charging current according to the voltage generated by the power supply, for charging the electronic device. Then, a voltage regulating capacitor installed in the electronic device stores electric charges via the charging current, for increasing a voltage of the voltage regulating capacitor to a predefined high voltage, to provide a voltage required by the electronic device. However, for increasing the voltage of the voltage regulating capacitor to the predefined high voltage rapidly, the charging current outputted by the power supply is usually large and cannot be stopped immediately (due to characteristic of an inductance). Therefore, after the power supply starts to output the charging current, the voltage of the voltage regulating capacitor will be larger than the predefined high voltage during a period, and over voltage is caused in the period. The over voltage not only wastes electric power but reduces lifetime of the electronic device.

Figure 1:
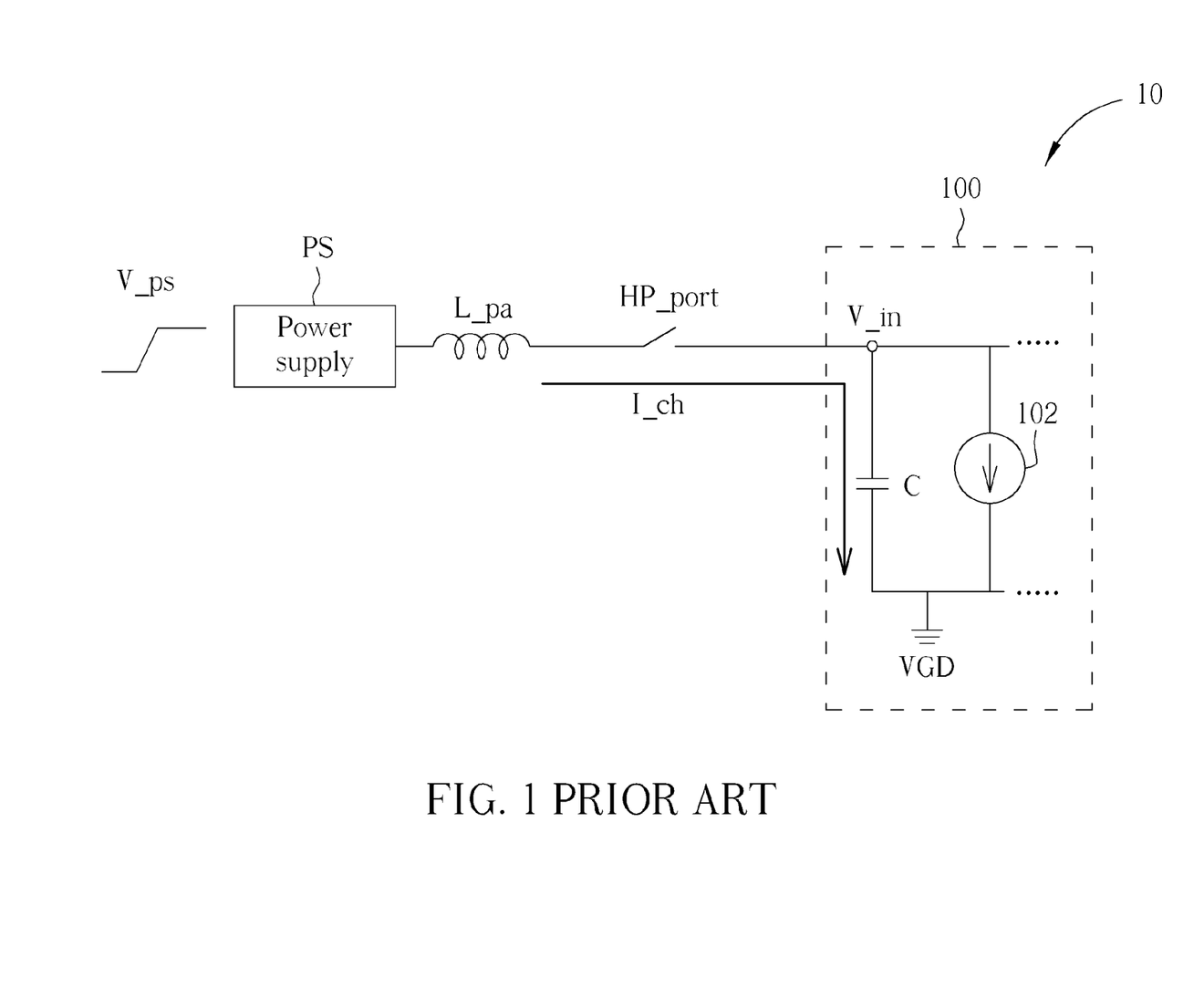
FIG. 1 is a schematic diagram of an electronic system according to the prior art.

For example, please refer to FIG. 1, which is a schematic diagram of an electronic system 10 according to the prior art. The electronic system 10 includes a power supply PS, an inductance L_pa, a hot-plug port HP_port and an electronic device 100. Further, the electronic device 100 includes a voltage regulating capacitor C, a ground end VGD and a general loading 102, and is coupled to the power supply PS via the hot-plug port HP_port. Besides, the inductance L_pa is a parasitic inductance, and usually exists between the power supply PS and the electronic device 100. When the hot-plug port HP_port turns on, the power supply PS outputs a charging current I_ch according to a voltage V_ps generated by the power supply PS, for charging the voltage regulating capacitor C, such that a voltage V_in of the voltage regulating capacitor C increases to a predefined high voltage VCC. After the voltage V_in equals the predefined high voltage VCC, the power supply PS keeps the voltage V_ps constant, for stopping outputting the charging current I_ch, to stop the voltage V_in increasing. However, the inductance L_pa prevents the charging current I_ch from a sudden change. That is, the charging current I_ch continues to charge the voltage regulating capacitor C. Therefore, the voltage V_in continues to increase, and becomes larger than the predefined high voltage VCC and the over voltage is caused. In practice, when the predefined high voltage VCC is set to 12 volts and the inductance L_pa and the voltage regulating capacitor C with general specifications are used, the over voltage causes the voltage V_in to reach 30-40 volts which are greatly larger than the predefined high voltage VCC.

Figure 2:
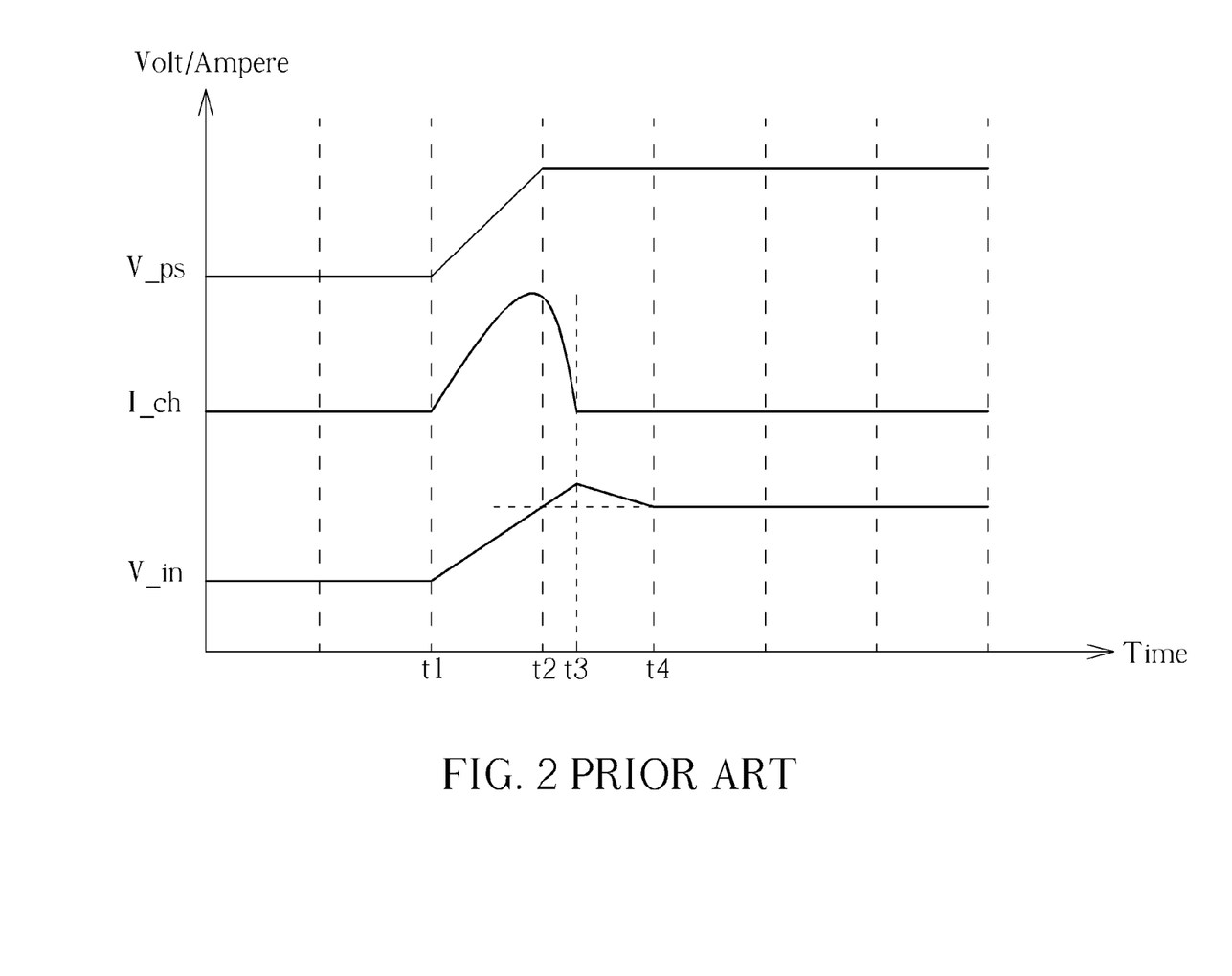
FIG. 2 is a schematic diagram of variations of the voltage V_ps, the charging current I_ch and the voltage V_in shown in FIG. 1

In detail, please refer to FIG. 2, which is a schematic diagram of variations of the voltage V_ps, the charging current I_ch and the voltage V_in shown in FIG. 1. When the hot-plug port HP_port turns on at time t1, the power supply PS increases the voltage V_ps immediately, and generates the charging current I_ch. Then, the voltage V_in starts to increase. When the voltage V_in increases to the predefined high voltage VCC at time t2, the inductance L_pa prevents the charging current I_ch from a sudden change, and the charging current I_ch continues to charge the voltage regulating capacitor C until time t3. When the charging current I_ch is zero and stops charging the voltage regulating capacitor C, the voltage V_in can discharge via the ground end VGD, to decrease to the predefined high voltage VCC at time t4. In other words, the general-loading 102 with a sink current will reduce the voltage V_in to the voltage V_ps. As shown in FIG. 2, the voltage V_in is affected by the over voltage between time t2 and time t4. Therefore, not only the electric power is wasted but the lifetime of the electronic device is reduced.

In the prior art, the voltage regulating capacitor C is increased for reducing an amplitude of increase of the voltage V_in, to mitigate the over voltage. However, it will still happen that the voltage V_in is larger than the predefined high voltage VCC. Besides, specification of the voltage regulating capacitor C is usually determined by a manufacturer of the electronic device but not an integrated circuit (IC) designer. That is, the method is restricted by features of the electronic device, and the over voltage cannot be solved completely. Therefore, how to solve the over voltage efficiently and completely is still a topic to be addressed.

SUMMARY OF THE INVENTION

The present invention therefore provides an over voltage protection circuit and an electronic system to solve the above-mentioned problems.

An over voltage protection circuit comprises an input end, coupled to an input power, for receiving an input voltage provided by the input power; and a driving module, coupled between the input end and a ground end, for generating a discharging current when the input voltage is larger than a predefined voltage, to reduce the input voltage to the predefined voltage. The driving module comprises a voltage regulating module, for generating a fixed voltage; a p-channel metal-oxide-semiconductor field-effect transistor (PMOS), comprising a source, coupled to the input end; a drain, coupled to the ground end; and a gate, coupled to the voltage regulating module, for receiving the fixed voltage via the gate, to operate according to the fixed voltage; and an n-channel metal-oxide-semiconductor field-effect transistor (NMOS), and the NMOS comprises a source, coupled to the ground end; a drain, coupled to the drain of the PMOS; and a gate. The PMOS and the NMOS are an upper gate switch and a lower gate switch of a motor driver or a fan driver.

An electronic system with over voltage protection comprises an input power, for providing an input voltage, and an over voltage protection circuit. The over voltage protection circuit comprises an input end, coupled to the input power, for receiving the input voltage; and a driving module, coupled between the input end and a ground end, for generating a discharging current when the input voltage is larger than a predefined voltage, to reduce the input voltage to the predefined voltage. The driving module comprises a voltage regulating module, for generating a fixed voltage; a p-channel metal-oxide-semiconductor field-effect transistor (PMOS), comprising a source, coupled to the input end; a drain, coupled to the ground end; and a gate, coupled to the voltage regulating module, for receiving the fixed voltage via the gate, to operate according to the fixed voltage; and an n-channel metal-oxide-semiconductor field-effect transistor (NMOS), and the NMOS comprises a source, coupled to the ground end; a drain, coupled to the drain of the PMOS; and a gate. The PMOS and the NMOS are an upper gate switch and a lower gate switch of a motor driver or a fan driver.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
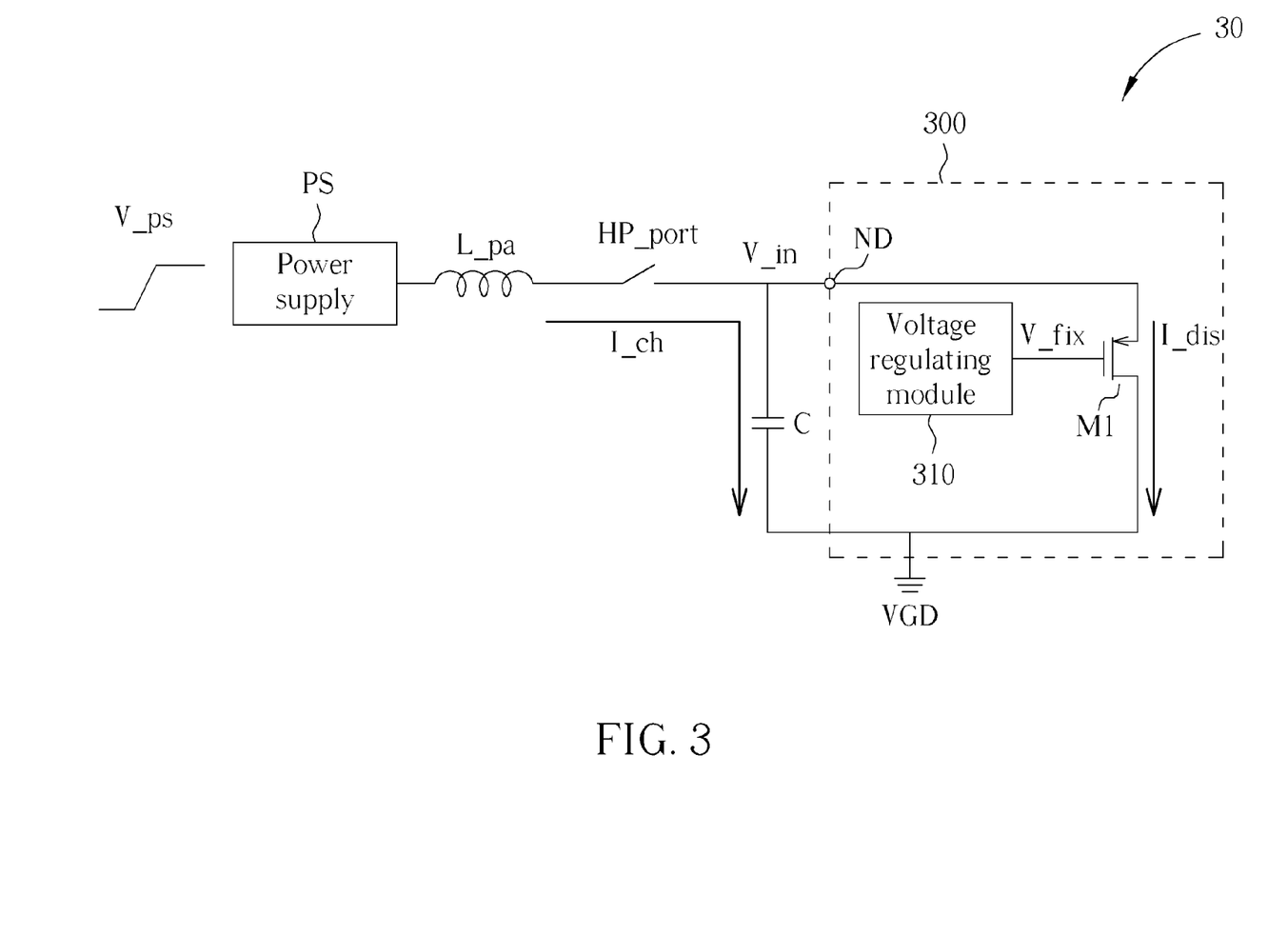
FIG. 3 is a schematic diagram of an electronic system according to an example of the present invention.

For example, please refer to FIG. 3, which is a schematic diagram of an electronic system 30 according to an example of the present invention. The electronic system 30 includes a power supply PS, an inductance L_pa, a hot-plug port HP_port, a voltage regulating capacitor C and an over voltage protection circuit 300. The over voltage protection circuit 300 is coupled between the hot-plug port HP_port and a ground end VGD, and is coupled to the power supply PS via the hot-plug port HP_port, for solving over voltage of the electronic system 30. Besides, the over voltage protection circuit 300 is coupled to the voltage regulating capacitor C in parallel. The inductance L_pa is a parasitic inductance, and usually exists between the power supply PS and the hot-plug port HP_port. In detail, the over voltage protection circuit 300 includes an input end ND, a voltage regulating module 310, and a p-channel metal-oxide-semiconductor field-effect transistor (PMOS) M1. The voltage regulating module 310 is used for providing a fixed voltage V_fix. The PMOS M1 includes a source, a gate and a drain. The source is coupled to the input end ND, for receiving a voltage V_in, the gate is coupled to the voltage regulating module 310, for receiving the fixed voltage V_fix, and the drain is coupled to the ground end VGD. Besides, the voltage regulating module 310 and the PMOS M1 can be combined as a driving module, to simplify the over voltage protection circuit 300.

When the hot-plug port HP_port turns on, the power supply PS outputs a charging current I_ch according to a voltage V_ps generated by the power supply PS, for charging the voltage regulating capacitor C, such that the voltage V_in of the voltage regulating capacitor C increases to a predefined high voltage VCC. After the voltage V_in equals the predefined high voltage VCC, the charging current I_ch continues to charge the voltage regulating capacitor C due to the characteristic of the inductance L_pa. When the voltage V_in continues to increase, the PMOS M1 discharges the voltage regulating capacitor C and reduces the voltage V_in back to the predefined high voltage VCC. In other words, when the voltage V_in is larger than a sum of the fixed voltage V_fix and a turn-on voltage of the PMOS M1, i.e., a difference between the voltage V_in and the fixed voltage V_fix is larger than the turn-on voltage, the over voltage protection circuit 300 starts to operate. In this situation, the PMOS M1 turns on and generates the discharging current I_dis, to discharge the over-voltage stored in the voltage regulating capacitor C. When the voltage V_in reduces and is lower than a sum of the fixed voltage V_fix and a turn-on voltage of the PMOS M1, the over voltage protection circuit 300 stop operations. In this situation, the PMOS M1 turns off, to stop discharging the voltage regulating capacitor C, so as to keep the voltage V_in and the predefined high voltage VCC the same. Therefore, the electronic system 30 can operate regularly by using the predefined high voltage VCC provided by the power supply PS, and at the same time, the over voltage protection circuit 300 prevents the electronic system 30 from the over voltage caused by the hot-plug port HP_port.

Figure 4:
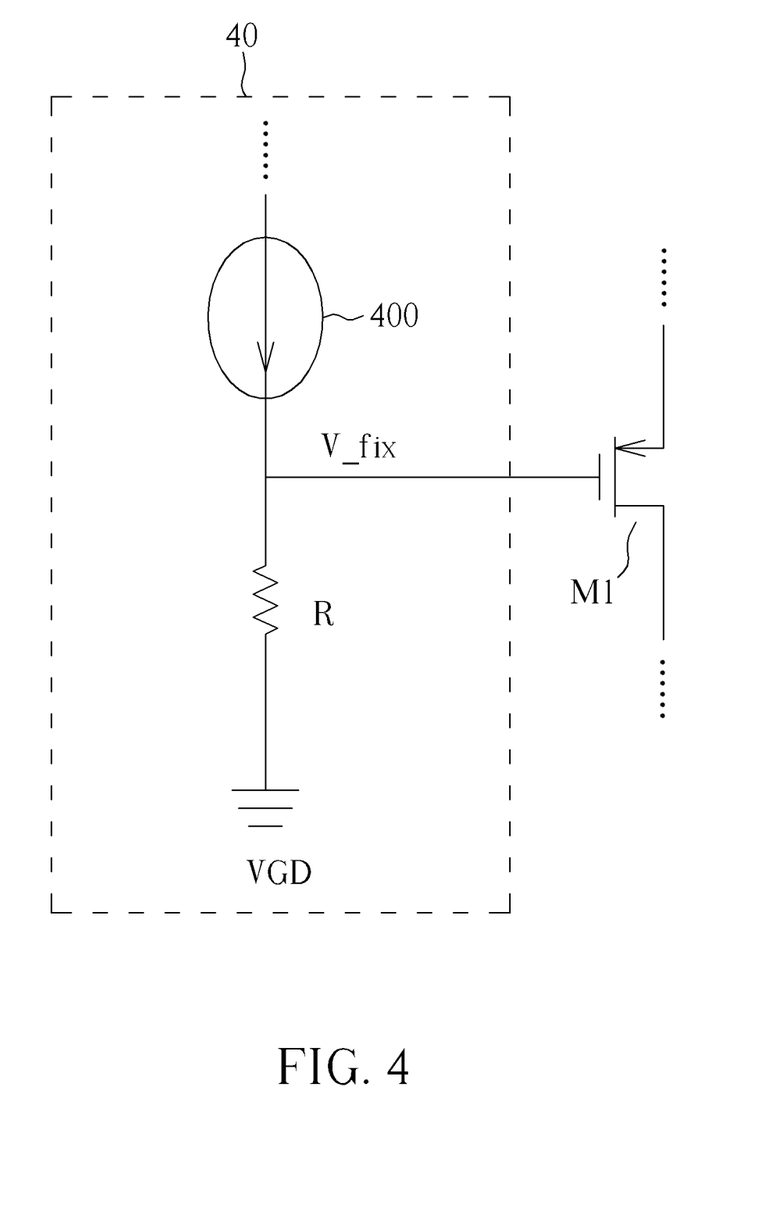
FIG. 4 is a schematic diagram of a voltage regulating module according to an example of the present invention.
Figure 5:
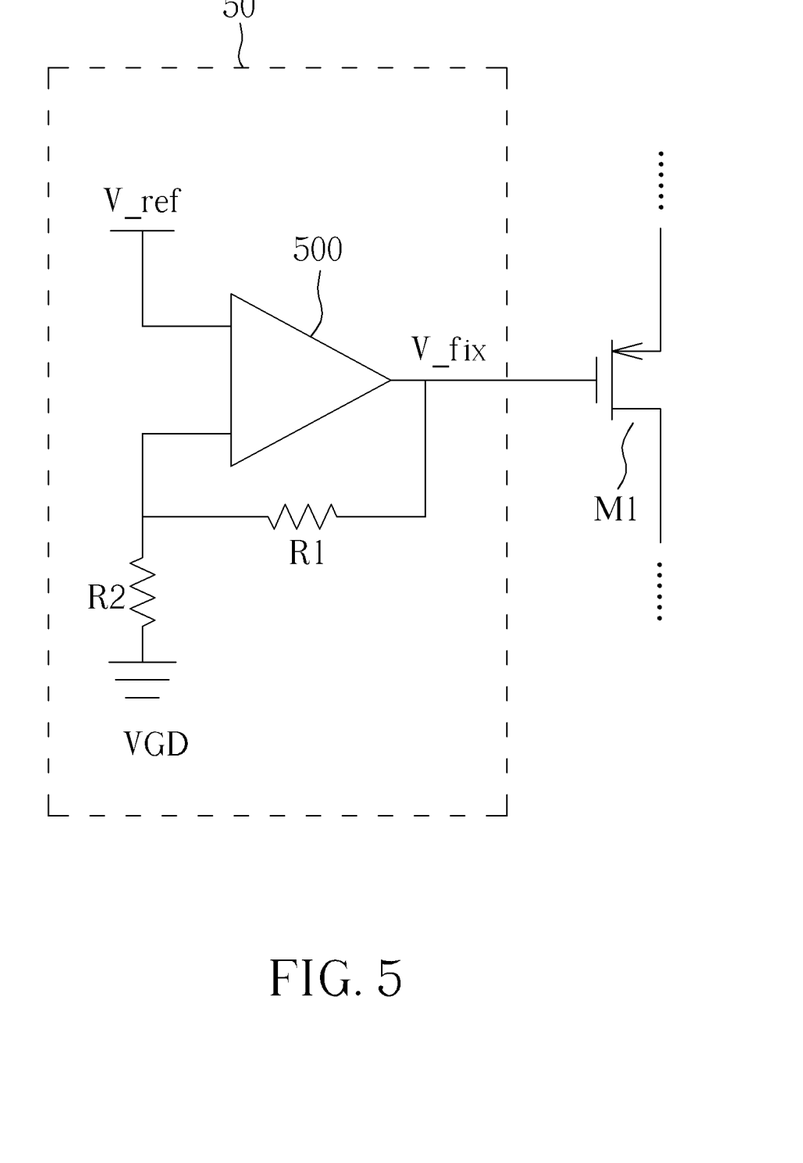
FIG. 5 is a schematic diagram of a voltage regulating module according to an example of the present invention.

Please note that, the voltage regulating module 310 is used for providing the fixed voltage V_fix which is stable to the gate of the PMOS M1 without being affected by the voltage V_in, and realization of the voltage regulating module 310 is not limited. For example, an independent current source or an independent voltage source which is independent of the voltage of the voltage regulating capacitor C is preferably used for constructing the voltage regulating module 310. Therefore, the voltage regulating capacitor C will not be under a negative feedback loop, and hardly controlled poles and zeros which cause instability to the over voltage protection circuit 300 will not be produced. Please refer to FIG. 4, which is a schematic diagram of a voltage regulating module 40 according to an example of the present invention. The voltage regulating module 40 is used for realizing the voltage regulating module 310 by using an independent current source. The voltage regulating module 40 includes an independent current source 400 and a resistor R. The voltage regulating module 40 can output a fixed voltage V_fix according to a voltage generated by the resistor R and the independent current source 400, wherein the fixed voltage V_fix is not affected by the voltage of the voltage regulating capacitor C. Besides, realization of the independent current source 400 is not limited. For example, a current mirror can be used for generating the independent current source 400 by using a current which is hardly affected by the voltage V_in. On the other hand, please refer to FIG. 5, which is a schematic diagram of a voltage regulating module 50 according to an example of the present invention. The voltage regulating module 50 is used for realizing the voltage regulating module 310 by using an independent voltage source. The voltage regulating module 50 includes an operational amplifier (OP) 500, a reference voltage V_ref, a ground end VGD, a resistor R1 and a resistor R2. The OP 500 can output a fixed voltage V_fix with a value of (1+R1/R2)V_ref according to virtual short of the OP 500, wherein the fixed voltage V_fix is independent of the voltage V_in. Therefore, the PMOS M1 can accurately turn on or turns off according to the voltage V_in, to solve the over voltage.

Figure 6:
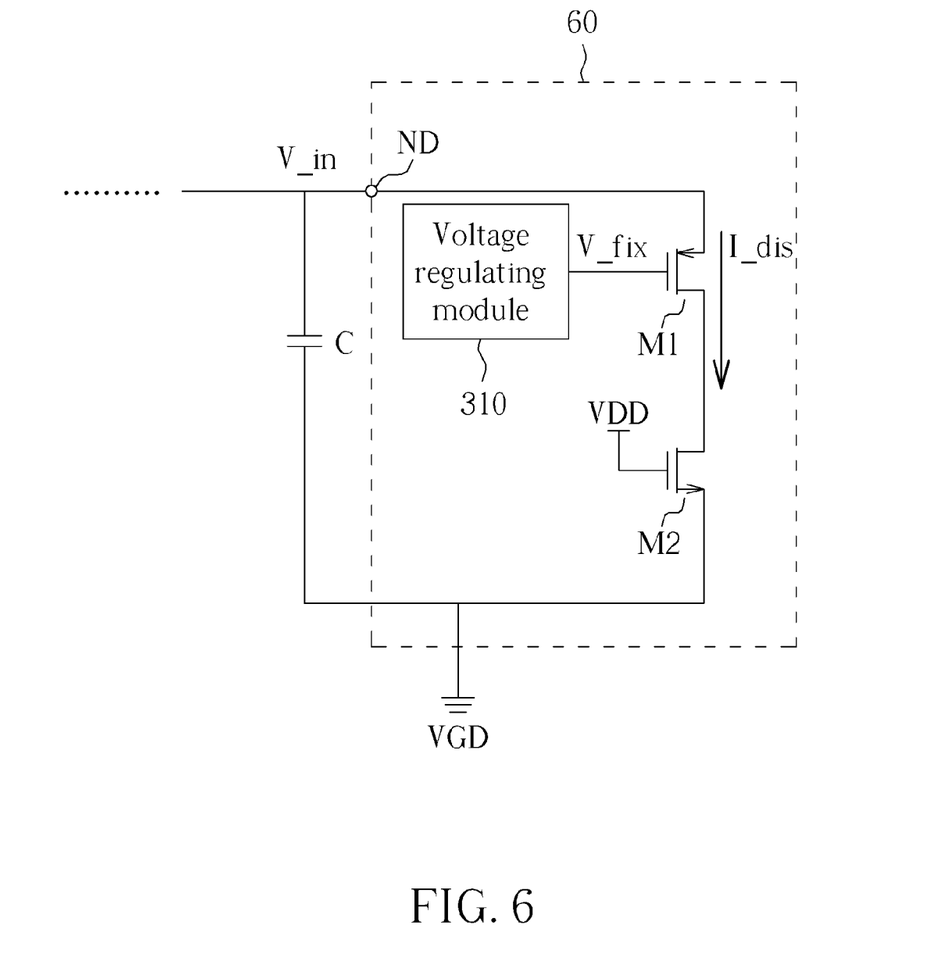
FIG. 6 is a schematic diagram of an over voltage protection circuit according to an example of the present invention.

On the other hand, a PMOS M1 with a larger area can be used in the over voltage protection circuit 300, for increasing the discharging current I_dis, to accelerate discharging the voltage regulating capacitor C. Therefore, the voltage V_in is reduced back to the predefined high voltage VCC rapidly, when the voltage V_in is larger than the predefined high voltage VCC. In short, the present invention can accelerate discharging to mitigate impact of the over voltage by controlling parameters of a transistor (e.g. size) used in the over voltage protection circuit. Besides, please refer to FIG. 6, which is a schematic diagram of an over voltage protection circuit 60 according to an example of the present invention. In FIG. 6, an n-channel metal-oxide-semiconductor field-effect transistor (NMOS) M2 is coupled between the PMOS M1 and a ground end VGD. This architecture is commonly seen in electronic devices. Since a gate of the NMOS M2 is coupled to a high voltage VDD, the NMOS M2 always turns on.

Besides, the fixed voltage V_fix relates to a turn-on voltage of the PMOS M1 and the predefined high voltage VCC. For example, when the turn-on voltage of the PMOS M1 is 1 volt, the fixed voltage V_fix can be set equal to the predefined high voltage VCC. Then, when the voltage V_in is 1 volt larger than the predefined high voltage VCC, the PMOS M1 turns on and generates the discharging current I_dis, to reduce the voltage V_in back to the predefined high voltage VCC. Alternatively, the fixed voltage V_fix can be set equal to (VCC−1), for reducing the voltage V_in back to the predefined high voltage VCC earlier. As a result, when the voltage V_in is larger than the predefined high voltage VCC, the PMOS M1 turns on immediately and generates the discharging current I_dis, to reduce the voltage V_in back to the predefined high voltage VCC. In short, the present invention can adjust a time at which the discharging current I_dis starts to discharge the voltage regulating capacitor C, to mitigate the impact of the over voltage by controlling the fixed voltage V_fix.

Figure 7:
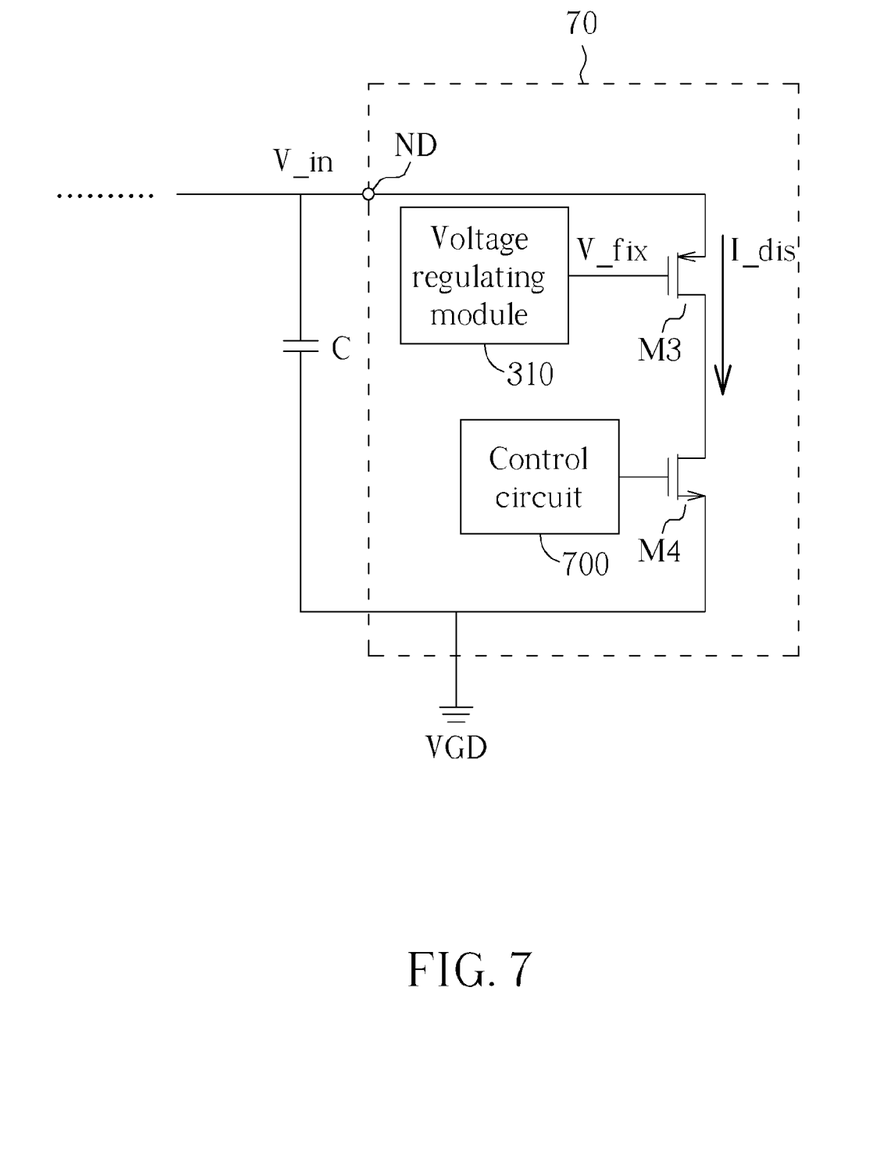
FIG. 7 is a schematic diagram of another over voltage protection circuit according to an embodiment of the present invention.

Moreover, please refer to FIG. 7, which is a schematic diagram of another over voltage protection circuit 70 according to an embodiment of the present invention. As shown in FIG. 7, the main differences between the over voltage protection circuit 70 and the over voltage protection circuit 60 are that a PMOS M3 and an NMOS M4 of the over voltage protection circuit 70 are an upper gate switch and a lower gate switch of a motor driver or a fan driver (i.e. embedded driver-MOS IC in motor-driver application) and the over voltage protection circuit 70 further includes a control circuit 700, coupled to the gate of the NMOS M4, for turning on the NMOS M4 when the voltage V_in is larger than a predefined voltage which indicates the voltage V_in is too high (e.g. the voltage V_in is larger than a sum of the fixed voltage V_fix and a turn-on voltage of the PMOS M3, i.e., a difference between the voltage V_in and the fixed voltage V_fix is larger than the turn-on voltage).

Under such a situation, since the PMOS M3 and the NMOS M4 are the upper gate switch and the lower gate switch of the motor driver or the fan driver, and thus are embedded power MOSs with great driving capability for driving a motor or a fan, such that no extra MOSs are needed for over voltage protection for the motor driver or the fan driver and the voltage regulating capacitor C can be discharged more quickly when the voltage V_in is larger than the predefined voltage. Noticeably, FIG. 7 only illustrates circuits related to over voltage protection, but the PMOS M3 and the NMOS M4 should receive pulse width modulation (PWM) for normal operations (the switching circuits for the PMOS M3 and the NMOS M4 to operate between over voltage protection and normal operations are omitted for clarification).

Figure 8:
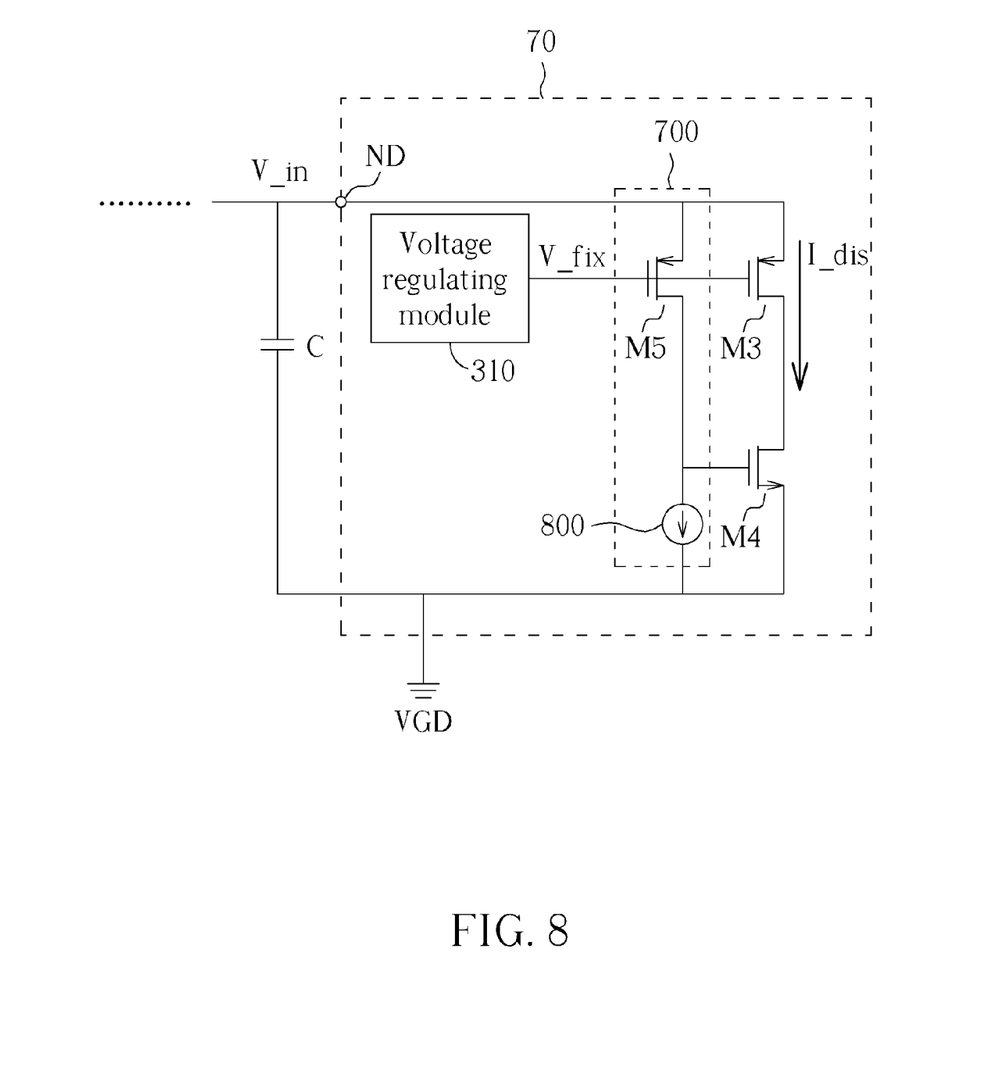
FIG. 8 is a schematic diagram of detailed circuit of a control circuit of the over voltage protection circuit shown in FIG. 7 according to an embodiment of the present invention.

In addition, please refer to FIG. 8, which is a schematic diagram of detailed circuit of the control circuit 700 of the over voltage protection circuit 70 according to an embodiment of the present invention. As shown in FIG. 8, the control circuit 700 includes a tracking PMOS M5 and a tracking current source 800. The tracking PMOS M5 includes a source, a gate and a drain. The source is coupled to the input end ND, for receiving a voltage V_in, the gate is coupled to the voltage regulating module 310, for receiving the fixed voltage V_fix, and the drain is coupled to the tracking current source 800. The tracking current source 800 is coupled between the ground end VGD and the drain of the tracking PMOS M5. The gate of the NMOS M4 is coupled between the drain of the tracking PMOS M5 and the tracking current source 800.

Under such a situation, since the tracking PMOS M5 has similar connection configuration with that of the PMOS M3 (but a size of the tracking PMOS M5 is much smaller than the PMOS M3 for reducing layout area), the tracking PMOS M5 tracks conduction status of the PMOS M3, such that when the PMOS M3 turns on, the tracking PMOS M5 also turns on. Then, a current flowing through the tracking PMOS M5 will be larger than a current, and thus a voltage supplied to the gate of the NMOS M4 will increase and thus the NMOS M4 is turned on. As a result, the NMOS M4 can be turned on when the voltage V_in is larger than the predefined voltage.

To sum up, the present invention performs discharging when a hot plug of an electronic device turns on, to reduce an input voltage to a predefined voltage. Therefore, over voltage caused by the hot plug is solved. Accordingly, electric power is saved and lifetime of the electronic device is extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An over voltage protection circuit, comprising:
   an input end, coupled to an input power via a hot-plug port, for receiving an input voltage provided by the input power; and
   a driving module, coupled between the input end and a ground end, for generating a discharging current when a turning-on of the hot-plug port causes the input voltage to be larger than a predefined voltage, to reduce the input voltage to the predefined voltage;
   wherein the driving module comprises:
      a voltage regulating module, for generating a fixed voltage;
      a p-channel metal-oxide-semiconductor field-effect transistor (PMOS), comprising a source, coupled to the input end; a drain, coupled to the ground end; and a gate, coupled to the voltage regulating module, for receiving the fixed voltage via the gate, to operate according to the fixed voltage;
      an n-channel metal-oxide-semiconductor field-effect transistor (NMOS), and the NMOS comprises a source, coupled to the ground end; a drain, coupled to the drain of the PMOS; and a gate; and
      a control circuit, coupled to the gate of the NMOS, for turning on the NMOS when the input voltage is larger than a predefined voltage;
      wherein the PMOS and the NMOS are an upper gate switch and a lower gate switch of a motor driver or a fan driver, and the control circuit further comprises:

a tracking PMOS, comprising a source, coupled to the input end; a drain; and a gate, coupled to the voltage regulating module, for receiving the fixed voltage via the gate, to operate according to the fixed voltage; and a tracking current source, coupled between the ground end and the drain of the tracking PMOS;

wherein the gate of the NMOS is coupled between the drain of the tracking PMOS and the tracking current source.

2. The over voltage protection circuit of claim 1, wherein the predefined voltage relates to a sum of the fixed voltage and a turn-on voltage of the PMOS.

3. The over voltage protection circuit of claim 1, wherein the voltage regulating module comprises:

a current source, for generating a fixed current; and a resistor, coupled to the current source, for generating a voltage difference as the fixed voltage according to the fixed current.

4. The over voltage protection circuit of claim 3, wherein the voltage regulating module comprises a current mirror, and the current source generates the fixed current according to the current mirror.

5. The over voltage protection circuit of claim 1, wherein the voltage regulating module comprises a voltage divider circuit, and the voltage divider circuit generates the fixed voltage according to a reference voltage.

6. The over voltage protection circuit of claim 5, wherein the voltage divider circuit comprises:

an operational amplifier (OP), comprising a first input end, for receiving the reference voltage, a second input end, and an output end for generating the fixed voltage;

a first resistor, coupled between the output end and the second input end; and a second resistor, coupled between the second input end and the ground end.

7. An electronic system with over voltage protection, comprising:

an input power, for providing an input voltage; and an over voltage protection circuit, comprising:

an input end, coupled to the input power via a hot-plug port, for receiving the input voltage; and a driving module, coupled between the input end and a ground end, for generating a discharging current when a turning-on of the hot-plug port causes the input voltage to be larger than a predefined voltage, to reduce the input voltage to the predefined voltage;

wherein the driving module comprises:

a voltage regulating module, for generating a fixed voltage;

a p-channel metal-oxide-semiconductor field-effect transistor (PMOS), comprising a source, coupled to the input end; a drain, coupled to the ground end; and a gate, coupled to the voltage regulating module, for receiving the fixed voltage via the gate, to operate according to the fixed voltage;

an n-channel metal-oxide-semiconductor field-effect transistor (NMOS), and the NMOS comprises a source, coupled to the ground end; a drain, coupled to the drain of the PMOS; and a gate; and a control circuit, coupled to the gate of the NMOS, for turning on the NMOS when the input voltage is larger than a predefined voltage;

wherein the PMOS and the NMOS are an upper gate switch and a lower gate switch of a motor driver or a fan driver, and the control circuit further comprises:

a tracking PMOS, comprising a source, coupled to the input end; a drain; and a gate, coupled to the voltage regulating module, for receiving the fixed voltage via the gate, to operate according to the fixed voltage; and a tracking current source, coupled between the ground end and the drain of the tracking PMOS;

wherein the gate of the NMOS is coupled between the drain of the tracking PMOS and the tracking current source.

8. The electronic system of claim 7, wherein the predefined voltage relates to a sum of the fixed voltage and a turn-on voltage of the PMOS.

9. The electronic system of claim 7, wherein the voltage regulating module comprises:

a current source, for generating a fixed current; and a resistor, coupled to the current source, for generating a voltage difference as the fixed voltage according to the fixed current.

10. The electronic system of claim 9, wherein the voltage regulating module comprises a current mirror, and the current source generates the fixed current according to the current mirror.

11. The electronic system of claim 7, wherein the voltage regulating module comprises a voltage divider circuit, and the voltage divider circuit generates the fixed voltage according to a reference voltage.

12. The electronic system of claim 11, wherein the voltage divider circuit comprises:

an operational amplifier (OP), comprising a first input end, for receiving the reference voltage, a second input end, and an output end for generating the fixed voltage;

a first resistor, coupled between the output end and the second input end; and a second resistor, coupled between the second input end and the ground end.

* * * * *